United States Patent
Yang et al.

(10) Patent No.: US 11,171,704 B2
(45) Date of Patent: Nov. 9, 2021

(54) METHOD FOR MANAGING WAVE BEAM, TERMINAL DEVICE AND NETWORK DEVICE

(71) Applicant: GUANGDONG OPPO MOBILE TELECOMMUNICATIONS CORP., LTD., Guangdong (CN)

(72) Inventors: Ning Yang, Dongguan (CN); Hua Xu, Ottawa (CA)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/334,314

(22) PCT Filed: Sep. 30, 2016

(86) PCT No.: PCT/CN2016/101273
§ 371 (c)(1),
(2) Date: Mar. 18, 2019

(87) PCT Pub. No.: WO2018/058608
PCT Pub. Date: Apr. 5, 2018

(65) Prior Publication Data
US 2019/0207665 A1    Jul. 4, 2019

(51) Int. Cl.
*H04B 7/06* (2006.01)
*H04B 7/08* (2006.01)
(Continued)

(52) U.S. Cl.
CPC ......... *H04B 7/0639* (2013.01); *H04B 7/0408* (2013.01); *H04B 7/06* (2013.01);
(Continued)

(58) Field of Classification Search
CPC .. H04B 7/0639; H04B 17/318; H04B 7/0408; H04B 7/06; H04B 7/0619; H04B 7/0626; H04B 7/0695; H04B 7/088
See application file for complete search history.

(56) References Cited

U.S. PATENT DOCUMENTS

2007/0249402 A1* 10/2007 Dong .................... H04W 16/28
                                                         455/562.1
2011/0110453 A1    5/2011 Prasad
(Continued)

FOREIGN PATENT DOCUMENTS

CN    101729457 A    6/2010
CN    103731923 A    4/2014
(Continued)

OTHER PUBLICATIONS

International Search Report in international application No. PCT/CN2016/101273, dated Jun. 13, 2017.
(Continued)

*Primary Examiner* — Janice N Tieu
(74) *Attorney, Agent, or Firm* — Ladas & Parry LLP

(57) ABSTRACT

Provided are a method for managing a wave beam, a terminal device and a network device. The method comprises: a terminal device sending, to a first network device, characteristic information about each wave beam in a first wave beam set, wherein the first wave beam set comprises at least one wave beam, and the characteristic information is used for the first network device to determine a target wave beam; the terminal device receiving indication information sent by the first network device, wherein the indication information is used for indicating the target wave beam determined by the first network device; and the terminal device performing wave beam management according to the target wave beam. In the embodiments of the present application, by means of sending characteristic information about (Continued)

a wave beam, a terminal device determines an optimal target wave beam for the terminal device, and then performs wave beam management according to the target wave beam, thereby improving the quality of signal transmission.

18 Claims, 5 Drawing Sheets

(51) Int. Cl.
  *H04B 17/318* (2015.01)
  *H04B 7/0408* (2017.01)
(52) U.S. Cl.
  CPC ......... *H04B 7/0619* (2013.01); *H04B 7/0626* (2013.01); *H04B 7/0695* (2013.01); *H04B 7/088* (2013.01); *H04B 17/318* (2015.01)

(56) References Cited

U.S. PATENT DOCUMENTS

| | | | |
|---|---|---|---|
| 2013/0017855 | A1 | 1/2013 | Hui |
| 2013/0083774 | A1 | 4/2013 | Son et al. |
| 2013/0235742 | A1 | 9/2013 | Josiam et al. |
| 2015/0236772 | A1 | 8/2015 | Hammarwall |
| 2016/0095102 | A1 | 3/2016 | Yu et al. |
| 2016/0150435 | A1* | 5/2016 | Baek ............... H04W 16/28 370/252 |
| 2017/0012692 | A1* | 1/2017 | Kim ............... H04B 7/0695 |
| 2017/0288763 | A1* | 10/2017 | Yoo ............... H04W 72/085 |
| 2017/0339662 | A1* | 11/2017 | Lin ............... H04W 24/10 |
| 2018/0048375 | A1* | 2/2018 | Guo ............... H04B 7/024 |
| 2019/0081688 | A1* | 3/2019 | Deenoo ............... H04B 7/0695 |
| 2019/0166527 | A1* | 5/2019 | Oketani ............... H04B 7/0695 |

FOREIGN PATENT DOCUMENTS

| | | |
|---|---|---|
| CN | 103628257 A | 5/2014 |
| CN | 104782056 A | 7/2015 |
| CN | 104955061 A | 9/2015 |
| CN | 105075321 A | 11/2015 |
| CN | 105375959 A | 3/2016 |
| CN | 105611569 A | 5/2016 |
| CN | 105684321 A | 6/2016 |
| CN | 106031051 A | 10/2016 |
| EP | 3110031 A1 | 12/2016 |
| EP | 3324697 A1 | 5/2018 |
| EP | 3490316 A1 | 5/2019 |
| JP | 2002152108 A | 5/2002 |
| JP | 2014531852 A | 11/2014 |
| JP | 2015527026 A | 9/2015 |
| KR | 20130034827 A | 4/2013 |
| KR | 1020150064757 A | 6/2015 |
| KR | 20150097939 A | 8/2015 |
| MX | 2013015265 A | 7/2014 |
| RU | 2529005 C2 | 9/2014 |
| TW | 201633737 A | 9/2016 |
| WO | 2012061770 A1 | 5/2012 |
| WO | 2013048212 A2 | 4/2013 |
| WO | 2015126130 A1 | 8/2015 |
| WO | 2016045621 A2 | 3/2016 |
| WO | 2016085266 A1 | 6/2016 |
| WO | 2016148127 A1 | 9/2016 |

OTHER PUBLICATIONS

Written Opinion of the International Search Authority in international application No. PCT/CN2016/101273, dated Jun. 13, 2017.
Supplementary European Search Report in the European application No. 16917358.0, dated Jul. 15, 2019.
English translation of the Written Opinion of the International Search Authority in the international application No. PCT/CN2016/101273, dated Jun. 13, 2017.
CMCC: "Discussion on intra-NR mobility", 3GPP Draft; R2-165216 Discussion of Mobility in Intra Nr, 3rd Generation Partnership Project (3GPP), Mobile Competence Centre ; 650, Route Des Lucioles ; F-06921 Sophia-Antipolis Cedex ; France, vol. RAN WG2 , no. Göteborg; Aug. 22, 2016-Aug. 26, 2016 Aug. 21, 2016 (Aug. 21, 2016), XP051126813, Retrieved from the Internet: URL:http://www.3gpp.org/ftp/Meetings_3GPP_SYNC/RAN2/Docs/ [retrieved on Aug. 21, 2016] the whole document.
First Office Action of Chilean application No. 201900803, dated Nov. 19, 2019.
First Office Action of Russian application No. 2019113086, dated Nov. 28, 2019.
Second Office Action in corresponding Chilean application No. 201900803, dated Mar. 11, 2020.
First Office Action in corresponding Chinese application No. 201680089512.7, dated Mar. 16, 2020.
Second Office Action in corresponding Russian application No. 2019113086, dated Mar. 19, 2020.
First Office Action in corresponding European application No. 16917358.0, dated Mar. 25, 2020.
First Office Action in corresponding Canadian application No. 3038706, dated Apr. 28, 2020.
Farhana Afroz et al., SINR. RSRP. RSSI and RSRQ Measurements in Long Term: Evolution Networks. International Journal of Wireless & Mobile Networks (IJWMN) vol. 7. No. 4. Aug. 2015.
Written Opinion of the Singaporean application No. 11201902859Y, dated Jun. 6, 2020.
Second Office Action of the Chinese application No. 201680089512.7, dated Jun. 19, 2020.
Notice of Allowance of the Russian application No. 2019113086, dated Jul. 27, 2020.
Second Office Action of the European application No. 16917358.0, dated Aug. 14, 2020.
Samsung, Discussion on TRP beamforming and beam management [online], 3GPP TSG-RAN WG1#86 R1-166785, Internet<URL: http://www.3gpp. org/ftp/tsg_ran/WGI RL1/TSGRI 802/Docs/R1 /166785. zip>, Aug. 26, 2016.
Beam selection and CSI acquisition for NR MIMO [online], and 3 GPP TSG-RAN WG1#86R1-166212. The internet <URL: http://www.3gpp. org/ftp/tsg_ran/WGI RL1/TSGRI 241/Docs/R1-166212. zip>, Aug. 26, 2016.
"3rd Generation Partnership Project; Technical Specification Group Radio Access Network; Evolved Universal Terrestrial Radio Access (E-UTRA); Physical layer procedures (Release 13)", 3GPP TS 36.213 V13.0.0 (Dec. 2015), http://www.3gpp.org.
First Office Action of the Japanese application No. 2019-516930, dated Sep. 8, 2020.
First Office Action of the Brazilian application No. 1120190061991, dated Sep. 15, 2020.
First Office Action of the Israel application No. 265702, dated Nov. 9, 2020.
Intel Corporation: "Mobility type support in NR", 3GPP Draft; R2-165000, 3rd Generation Partnership Project (3GPP), Mobile Competence Centre; 650, Route Des Lucioles; F-06921 Sophia-Antipolis Cedex; France, vol. RAN WG2, no. Gothenburg, Sweden; Aug. 22, 2016-Aug. 26, 2016 Aug. 21, 2016 (Aug. 21, 2016).
Third Office Action of the European application No. 16917358.0, dated Jan. 12, 2021.
Second Office Action of the Canadian application No. 3038706, dated Feb. 22, 2021.
First Office Action of the Taiwanese application No. 106129743, dated Apr. 30, 2021.
First Office Action of the Indonesian application No. P00201903623, dated Jun. 16, 2021.
Fourth Office Action of the European application No. 16917358.0, dated Jun. 18, 2021.
Office Action of the Indian application No. 201917015525, dated Jun. 25, 2021.
Third Office Action of the Chilean application No. 201900803, dated Jul. 1, 2021.

(56) References Cited

OTHER PUBLICATIONS

Office Action of the Australian application No. 2016424446, dated Aug. 2, 2021.

* cited by examiner

METHOD FOR MANAGING WAVE BEAM, TERMINAL DEVICE AND NETWORK DEVICE

RELATED APPLICATION

This application is an application under 35 U.S.C. 371 of International Application No. PCT/CN2016/101273 filed on Sep. 30, 2016, the entire contents of which are incorporated herein by reference.

TECHNICAL FIELD

The disclosure relates to the field of communications, and in particular to a method for managing beams, a terminal device and a network device.

BACKGROUND

A Multiple-Input Multiple-Output (MIMO) technology is one of core technologies in a Long Term Evolution (LTE) system and may greatly improve a transmission rate of the system. Beamforming is a signal preprocessing technology based on an antenna array. By adjusting a weight of each signal sent on each antenna array element, a beam with directivity is generated.

In a convention art, a terminal device sends a signal in a beamforming manner and a network device performs beam scanning in a cell, i.e., the terminal device may send the signal to the network device by using a plurality of beams. Under such a circumstance, there is a need to propose a novel design scheme on how to manage beam connection of the plurality of beams to improve the quality of signal transmission.

SUMMARY

In view of this, the embodiments of the disclosure provide a method for managing beams, a terminal device and a network device, which may improve the quality of signal transmission.

A first aspect provides a method for managing beams, which may include: a terminal device sends characteristic information of each beam in a first beam set to a first network device, where the first beam set includes at least one beam, and the characteristic information is used for the first network device to determine a target beam; the terminal device receives indication information sent by the first network device, where the indication information is used for indicating the target beam determined by the first network device; and the terminal device performs the beam management according to the target beam.

The terminal device sends the characteristic information of each beam in the beam set to the network device, the network device determines the target beam according to the characteristic information and receives the indication information sent by the network device and used for indicating the determined target beam, and thus the beam management is performed according to the target beam. In this way, the terminal device sends the characteristic information of the beams, the network device determines an optimal target beam for the terminal device and then the beam management is performed according to the target beam. Therefore, the quality of signal transmission is improved.

In some possible implementation manners, the method may further include: the terminal device acquires channel quality of each beam in the first beam set; and that a terminal device sends characteristic information of each beam in a first beam set to a first network device may include: the terminal device sends the characteristic information of each beam in the first beam set to the first network device, where the characteristic information carries channel quality information used for indicating the channel quality.

The terminal device may determine the channel quality of each beam by itself, or the channel quality is determined by the network device to send to the terminal device, and channel measurement information is carried in characteristic information of a beam sent to the network device; and thus, the network device determines the target beam according to the channel measurement information.

In some possible implementation manners, the first beam set is determined in accordance with a relationship between channel quality of a beam in a second beam set and preset channel quality; the second beam set includes one or more beams, characteristic information of which can be measured by the terminal device in a first beam used by the terminal device; and the first beam corresponds to the first network device.

The relationship between the beam in the second beam set and the preset channel quality may also be any judgment condition that meets a certain function relationship or is greater than, equal to or smaller than some preset threshold value, so that the terminal device can further reduce a range of the beam set and determines the target beam accurately.

In some possible implementation manners, the method may further include: the terminal device determines the first beam set according to a relationship among the channel quality of the first beam, the channel quality of the beam in the second beam set and the preset channel quality; and that the terminal device manages beam connection according to the target beam may include: the terminal device performs beam switching from the first beam to the target beam according to the target beam.

When the terminal device performs the beam management, a state that a current beam is connected may be considered. If the channel quality of the current beam cannot meet the requirement, the first beam set that meets the requirement may be selected from the second beam set.

In some possible implementation manners, that the terminal device determines the first beam set according to the channel quality of the first beam may include: the terminal device determines, when the channel quality of the first beam is smaller than a first preset channel quality threshold value, at least one beam greater than a second preset channel quality threshold value in the second beam set as the first beam set.

The terminal device determines, when the channel quality of the first beam is smaller than the first preset channel quality threshold value, at least one beam whose channel quality is greater than the second preset channel quality threshold value in the second beam set as the first beam set. Herein, the first preset channel quality threshold value and the second preset channel quality threshold value may be the same and may also be different, and may be set according to the requirement in an actual application.

In some possible implementation manners, that the terminal device determines the first beam set according to the channel quality of the first beam may include: the terminal device determines, when the channel quality of the first beam is smaller than a first preset channel quality threshold value, at least one beam greater than a second preset channel quality threshold value in the second beam set as a third beam set; and the terminal device determines a beam with the highest channel quality in the third beam set as the first beam set.

The terminal device selects a target beam that is considered to be optimal and the network device confirms where the target beam is appropriate or not, thereby receiving occupancy of resources of the network device.

In some possible implementation manners, the method may further include: the terminal device determines at least one beam greater than the second preset channel quality threshold value in the second beam set as the first beam set; and that the terminal device manages beam connection according to the target beam may include: the terminal device establishes auxiliary connection of the target beam according to the target beam.

The terminal device may establish the auxiliary connection so that a part of bearers or data streams are configured to the beam of the auxiliary connection to improve the signal transmission efficiency.

In some possible implementation manners, the method may further include: the terminal device determines at least one beam greater than the second preset channel quality threshold value in the second beam set as a third beam set; and the terminal device determines a beam with the highest channel quality in the third beam as the first beam set; and that the terminal device manages beam connection according to the target beam may include: the terminal device establishes the auxiliary connection of the target beam according to the target beam.

The terminal device selects a target beam that is considered to be optimal; and the network device confirms whether the target beam is appropriate or not, thereby establishing the auxiliary connection according to the target beam to improve the signal transmission efficiency.

In some possible implementation manners, the method may further include: the terminal device determines at least one beam smaller than the first preset channel quality threshold value in the second beam set as the first beam set; and that the terminal device manages beam connection according to the target beam may include: the terminal device deletes the auxiliary connection of the target beam according to the target beam.

The terminal device may delete the auxiliary connection of a beam that does not meet a preset condition to save the bandwidth occupancy.

In some possible implementation manners, the method may further include: the terminal device determines at least one beam smaller than the first preset channel quality threshold value in the second beam set as a third beam set; and the terminal device determines a beam with the lowest channel quality in the third beam as the first beam set; and that the terminal device manages beam connection according to the target beam may include: the terminal device deletes the auxiliary connection of the target beam according to the target beam.

The terminal device selects a target beam that is considered to be optimal; and the network device confirms whether the target beam is appropriate or not; and at last, the auxiliary connection of the beam that does not meet the preset condition is deleted to save the bandwidth occupancy.

In some possible implementation manners, the first beam is a boundary beam of a fourth beam set; and characteristic information of each of a plurality of beams included in the fourth beam set is the same as that of the first beam.

In some possible implementation manners, the indication information carries at least one of a beam Identity (ID) of the target beam, a cell ID, a beam group ID of the target beam, a network device ID of a second network device or beam configuration information, where the second network device is a network device corresponding to the target beam.

In some possible implementation manners, that the terminal device manages beam connection according to the target beam may include: the terminal device sends a signal by using the target beam.

In some possible implementation manners, the characteristic information of each beam in the first beam set further carries at least one of the beam ID or the beam group ID.

A second aspect provides a method for managing beams, which may include: a first network device receives characteristic information of each beam in a first beam set from a terminal device, where the first beam set includes a plurality of beams; the first network device determines a target beam in the first beam set according to the characteristic information of each beam in the first beam set; and the first network device sends indication information to the terminal device, where the indication information is used for indicating the target beam determined by the first network device.

The network device receives the characteristic information, sent by the terminal device, of each beam in the beam set, determines the target beam according to the characteristic information, and sends the indication information for indicating the determined target beam to the terminal device, so that the terminal device performs the beam management according to the target beam. In this way, the terminal device sends the characteristic information of the beams, the network device determines an optimal target beam for the terminal device and then the beam management is performed according to the target beam. Therefore, the quality of signal transmission is improved.

In some possible implementation manners, that a first network device receives characteristic information of each beam in a first beam set from a terminal device may include: the first network device receives the characteristic information of each beam in the first beam set from the terminal device, where the characteristic information carries channel quality information used for indicating the channel quality.

In some possible implementation manners, the first beam set is determined in accordance with a relationship between a beam in a second beam set and preset channel quality; the second beam set includes one or more beams, characteristic information of which can be measured by the terminal device in a first beam used by the terminal device; and the first beam corresponds to the first network device.

In some possible implementation manners, the first beam is a boundary beam of a fourth beam set; and characteristic information of each of a plurality of beams included in the fourth beam set is the same as that of the first beam.

In some possible implementation manners, the target beam corresponds to a second network device; the method may further include: the first network device sends a beam configuration request message to the second network device, where the beam configuration request message carries a beam ID of the target beam; and the first network device receives a beam configuration response message sent by the second network device, where the beam configuration response message carries beam configuration information; and that the first network device sends indication information to the terminal device may include: the first network device sends indication information carrying the beam configuration information, the beam ID of the target beam and a network device ID of the second network device to the terminal device.

In some possible implementation manners, the indication information carries at least one of the beam ID or the beam group ID of the target beam.

In some possible implementation manners, the characteristic information of each beam in the first beam set further carries at least one of the beam ID or the beam group ID.

A third aspect provides a terminal device, which may include each module for executing the method in the first aspect or any possible implementation manner of the first aspect.

A fourth aspect provides a network device, which may include each module for executing the method in the second aspect or any possible implementation manner of the second aspect.

A fifth aspect provides a communication system, which may include the terminal device in the third aspect and the network device in the fourth aspect.

A sixth aspect provides a terminal device, which may include: a processor and a memory.

The memory stores a program; and the processor executes the program and is configured to execute the method for managing the beams in the first aspect or any possible implementation manner of the first aspect.

A seventh aspect provides a network device, which may include: a processor and a memory.

The memory stores a program; and the processor executes the program and is configured to execute the method for managing the beams in the second aspect or any possible implementation manner of the second aspect.

An eighth aspect provides a computer storage medium; a program code is stored in the computer storage medium; and the program code is configured to indicate to execute the method for managing the beams in the first aspect or any possible implementation manner of the first aspect.

A ninth aspect provides a computer storage medium; a program code is stored in the computer storage medium; and the program code is configured to indicate to execute the method for managing the beams in the second aspect or any possible implementation manner of the second aspect.

Based on the above technical solutions, the terminal device sends the characteristic information of each beam in the beam set to the network device, the network device determines the target beam according to the characteristic information and receives the indication information sent by the network device and used for indicating the determined target beam, and thus the beam management is performed according to the target beam. In this way, the terminal device sends the characteristic information of the beams, the network device determines the optimal target beam for the terminal device and then the beam management is performed according to the target beam. Therefore, the quality of signal transmission is improved.

BRIEF DESCRIPTION OF DRAWINGS

In order to describe the technical solutions in the embodiments of the disclosure more clearly, a simple introduction on the accompanying drawings which are needed in the description of the embodiments is given below. Apparently, the accompanying drawings in the description below are merely some of the embodiments of the disclosure, based on which other drawings may be obtained by those of ordinary skill in the art without any creative effort.

DETAILED DESCRIPTION

Figure 1:
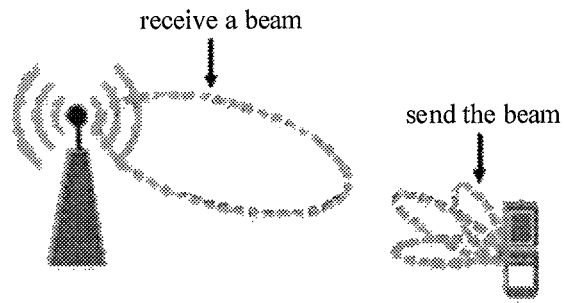
FIG. 1 illustrates a diagram of an application scene according to an embodiment of the disclosure.

A clear and complete description of the technical solutions in the disclosure will be given below, in combination with the accompanying drawings in the embodiments of the disclosure. Apparently, the embodiments described below are a part, but not all, of the embodiments of the disclosure. All of the other embodiments, obtained by those of ordinary skill in the art based on the embodiments of the disclosure without any inventive efforts, fall into the protection scope of the disclosure.

It should be understood that the technical solutions of the disclosure may be applied in various communications systems, such as a Global System of Mobile communication (abbreviated as "GSM") system, a Code Division Multiple Access (abbreviated as "CDMA") system, a Wideband Code Division Multiple Access (abbreviated as "WCDMA") system, a General Packet Radio Service (abbreviated as "GPRS") system, an LTE system, an LTE Frequency Division Duplex (abbreviated as "FDD") system, an LTE Time Division Duplex (abbreviated as "TDD") system, a Universal Mobile Telecommunication System (abbreviated as "UMTS") system, a Worldwide Interoperability for Microwave Access (abbreviated as "WiMAX") communication system or a future 5th Generation (5G) system.

Particularly, the technical solutions in the embodiments of the disclosure may be applied to various communication systems based on a non-orthogonal multiple access technology, such as a Sparse Code Multiple Access (abbreviated as "SCMA") system and a Low Density Signature (abbreviated as "LDS") system. Of course, the SCMA system and the LDS system may also be referred to as other names in the field of communications. Further, the technical solutions in the embodiments of the disclosure may be applied to multi-carrier transmission systems adopting the non-orthogonal multiple access technology, such as an Orthogonal Frequency Division Multiplexing (abbreviated as "OFDM") system, a Filter Bank Multi-Carrier (abbreviated as "FBMC") system, a Generalized Frequency Division Multiplexing (abbreviated as "GFDM") system and a Filtered-OFDM (abbreviated as "F-OFDM") system.

The terminal device in the embodiments of the disclosure may be User Equipment (UE), an access terminal, a user unit, a user station, a mobile station, a mobile platform, a remote station, a remote terminal, a mobile device, a user terminal, a terminal, a wireless communication device and a user proxy or user apparatus. The access terminal may be a cellular phone, a cordless telephone, a Session Initiation Protocol (SIP) phone, a Wireless Local Loop (WLL) station, a Personal Digital Assistant (PDA), a handheld device having a wireless communication function, a computing device or other processing devices, vehicle-amounted devices and wearable devices connected to a wireless modulator-demodulator, a terminal device in a future 5G network or a terminal device in a future evolved Public Land Mobile Network (PLMN), all of which are not defined in the embodiments of the disclosure.

The network device in the embodiments of the disclosure may be a device used for communicating with the terminal device. The network device may be a Base Transceiver Station (BTS) in a GSM or CDMA, may also be a NodeB (NB) in a WCDMA system, may further be an Evolutional NodeB (eNB or eNodeB) in an LTE system and may further be a wireless controller in a Cloud Radio Access Network (CRAN) scene; or the network device may be a relay station, an access point, a vehicle-amounted device, a wearable device as well as a network device in the future 5G system or a network device in the future evolved PLMN network, all of which are not defined in the embodiments of the disclosure.

FIG. 1 illustrates a schematic diagram of an application scene of the disclosure. The communication system in FIG. 1 may include a terminal device and a network device. The terminal device sends a signal by employing a plurality of beams to communicate with the network device.

In a 5G system, it is necessary to support data transmission at a high frequency band (the central frequency is 6 GHz or more and typically may be, for example, 28 GHz) to meet the requirement of the 5G on the transmission rate. During the data transmission at the high frequency band, in order to achieve a higher transmission rate, a MIMO technology needs to be adopted.

Beamforming is a signal preprocessing technology based on an antenna array. By adjusting a weight of each signal sent on each antenna array element, a beam with directivity is generated.

In the conventional art, the terminal device sends the signal to the network device by employing a plurality of beams in a beamforming manner. A novel design solution for managing connection of the plurality of beams is proposed in the embodiments of the disclosure and can improve the quality of signal transmission.

Figure 2:
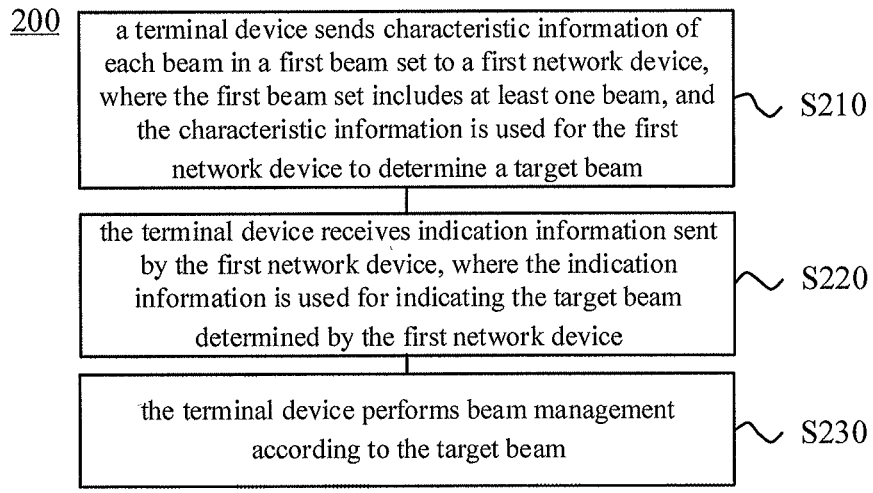
FIG. 2 illustrates a schematic diagram of a method for managing beams according to an embodiment of the disclosure.

FIG. 2 illustrates a schematic diagram of a method 200 for managing beams according to an embodiment of the disclosure. An execution main body of the method 200 may be a terminal device. The method 200 may include the following operations.

At S210, a terminal device sends characteristic information of each beam in a first beam set to a first network device, where the first beam set includes a plurality of beams, and the characteristic information is used for the first network device to determine a target beam.

At S220, the terminal device receives indication information sent by the first network device, where the indication information is used for indicating the target beam determined by the first network device.

At S330, the terminal device performs the beam management according to the target beam.

Specifically, the first beam set includes at least one beam. The terminal device sends the characteristic information of each beam in the first beam set to the network device (indicated as the first network device), the characteristic information may be used for the network device to determine the target beam, and the terminal device receives the indication information sent after the network device determines the target beam. In this way, the terminal device may perform the beam management according to the target beam.

The characteristic information may be used by the network device to distinguish the excellence of beamforming gains of signals sent by different beams. Optionally, the characteristic information may further carry at least one of a beam ID, a beam group ID of the target beam, a cell ID, a network device ID of a second network device or beam configuration information. In this way, the network device can determine a beam with an optimal beamforming gain according to the characteristic information and send a notification message to the terminal device.

The beam management may include: establishment of beam connection, switching of beam connection, addition, deletion or other connection processes of the auxiliary connection and the like, all of which are not defined by the disclosure.

It should be understood that the characteristic information may be independently sent and may also be carried in a Demodulation Reference Signal (DMRS), a Physical Uplink Control Channel (PUCCH) or a Sounding Reference Signal (SRS), and the indication information may be carried in a Radio Resource Control (RRC) message or downlink control information signaling, all of which are not defined by the disclosure.

It should be understood that the characteristic information, sent by the terminal device, of beams in the beam set may be sent simultaneously and may also be periodically sent or may be sent in a polling manner, all of which are not defined by the disclosure.

It is to be noted that the different beams may be viewed as beams in different beam directions, and may also be beams in a same beam direction. For the convenience of description, the embodiments of the disclosure are described with the different beams representing the different beam directions as an example.

Therefore, with the method for managing the beams in this embodiment of the disclosure, the terminal device sends the characteristic information of each beam in the beam set to the network device, the network device determines the target beam according to the characteristic information and receives the indication information sent by the network device and used for indicating the determined target beam, and thus the beam management is performed according to the target beam. In this way, the terminal device sends the characteristic information of the beams, the network device determines an optimal target beam for the terminal device and then the beam management is performed according to the target beam. Therefore, the quality of signal transmission is improved.

Optionally, this embodiment of the disclosure may be applied to initially establishing beam connection, the terminal device determines a beam that can be supported as the first beam set, the network device selects the target beam from the first beam set and notifies the terminal device via the indication information, and the terminal device establishes beam connection of the target beam.

Optionally, as an embodiment, the method may further include: the terminal device acquires channel quality of each beam in the first beam set; and that a terminal device sends characteristic information of each beam in a first beam set to a first network device may include: the terminal device sends the characteristic information of each beam in the first beam set to the first network device, where the characteristic information carries channel quality information used for indicating the channel quality.

Specifically, the terminal device may determine the channel quality of each beam by itself, or the channel quality is determined by the network device to send to the terminal device, and channel measurement information is carried in characteristic information of a beam sent to the network device; and thus, the network device determines the target beam according to the channel measurement information.

Optionally, as an embodiment, the first beam set is determined in accordance with a relationship between a beam in a second beam set and preset channel quality; the second beam set includes one or more beams, characteristic information of which can be measured by the terminal device in a first beam used by the terminal device; and the first beam corresponds to the first network device.

Specifically, the second beam set may be composed of all or a part of beams through which the terminal device can acquire characteristic information of surrounding beams, and may be referred to as an adjacent beam. The first beam is a beam used by the terminal device at present. When the first beam is within a range covered by the first network device, the second beam set may be an adjacent beam of the first beam. Beams in the second beam set may be within a range covered by the first network device, and may also be within a range covered by other network devices.

The first preset condition may also be any judgment condition that meets a certain function relationship or is greater than, equal to or smaller than some preset threshold value, so that the terminal device can further reduce a range of the beam set and determines the target beam accurately.

It should be understood that various configuration information through which the terminal device performs the beam management according to the target beam may be configured to the terminal device in advance via a system message or via a special signaling process, and may also be carried in a same message together with the indication information, all of which are not defined by the disclosure.

Optionally, the characteristic information of each beam in the first beam set further carries identification information of each beam, so that after a beam with the optimal channel quality is determined, the network device can know what the beam is specifically. Optionally, the terminal device may also send channel quality of a first beam to the network device; and the network device can determine the target beam with the compressive consideration to a relationship between a current beam and an alternative beam, so that the terminal device can perform the beam management.

Optionally, as an embodiment, the method may further include: the terminal device determines the first beam set according to the channel quality of the first beam; and that the terminal device manages beam connection according to the target beam may include: the terminal device performs beam switching from the first beam to the target beam according to the target beam.

Specifically, when the terminal device performs the beam management, a state that a current beam is connected may be considered. If the channel quality of the current beam cannot meet the requirement, the first beam set that meets the requirement may be selected from the second beam set. In this way, after the terminal device sends the characteristic information of each beam in the first beam set to the network device, the network device may determine the target beam and send the indication information to notify the terminal device, so that the terminal device may be switched from the first beam to the target beam.

It should be understood that since the beam switching also needs to occupy resources, the requirement of the terminal device on the channel quality of the current beam may not be the same as that on the beams in the second beam set.

It should be further understood that the beam switching process may include a downlink and/or an uplink.

Optionally, as an embodiment, that the terminal device determines the first beam set according to the channel quality of the first beam may include: the terminal device determines, when the channel quality of the first beam is smaller than a first preset channel quality threshold value, at least one beam greater than a second preset channel quality threshold value in the second beam set as the first beam set.

Specifically, the terminal device determines, when the channel quality of the first beam is smaller than the first preset channel quality threshold value, at least one beam whose channel quality is greater than the second preset channel quality threshold value in the second beam set as the first beam set. Herein, the first preset channel quality threshold value and the second preset channel quality threshold value may be the same and may also be different, and may be set according to the requirement in an actual application.

Optionally, the terminal device may further consider to compare the channel quality of the first beam with the at least one beam greater than the second preset channel quality threshold value. Specifically, the terminal device may determine a beam higher than the channel quality of the first beam in the at least one beam greater than the second preset channel quality threshold value as the first beam set. A deviation value may further be provided, i.e., a beam higher than the channel quality of the first beam and greater than the deviation value in the at least one beam greater than the second preset channel quality threshold value is determined as the first beam set.

It should be understood that the first preset threshold value may be viewed as a preset requirement of the terminal device on the channel quality of the first beam, and the second preset threshold value may be a preset requirement on the channel quality of the beams in the first beam set. The following embodiments will be described with this corresponding relationship as an example, and specific values of the first preset threshold value and the second preset threshold value in different embodiments are not defined.

Optionally, as an embodiment, that the terminal device determines the first beam set according to the channel quality of the first beam may include: the terminal device determines, when the channel quality of the first beam is smaller than a first preset channel quality threshold value, at least one beam greater than a second preset channel quality threshold value in the second beam set as a third beam set; and the terminal device determines a beam with the highest channel quality in the third beam set as the first beam set.

Specifically, the terminal device determines, when the channel quality of the first beam is smaller than the first preset channel quality threshold value, at least one beam greater than the second preset channel quality threshold value in the second beam set as the third beam set. Herein, the terminal device may screen a beam with more appropriate channel quality to form the first beam set in advance according to an own requirement and the like, and sends the characteristic information of each beam in the first beam set to the network device. The terminal device may take a beam with the best channel quality as the beam to form the first beam set when selecting the first beam set. If two beams with the best channel quality exist, it may be appropriate to select either of them as the beam in the first beam set and may also be appropriate to take both as the beams to form the first beam set. The terminal device sends, upon the determination of the first beam set, the characteristic information of each beam in the first beam set to the network device, and the network device determines the target beam according to the characteristic information. If two beams having the same channel quality exist in the first beam set, either of them is selected as the target beam.

Optionally, the terminal device may further consider to compare the channel quality of the first beam with the at least one beam greater than the second preset channel quality threshold value. Specifically, the terminal device may determine a beam higher than the channel quality of the first beam in the at least one beam greater than the second preset channel quality threshold value as the first beam set. A deviation value may further be provided, i.e., a beam higher than the channel quality of the first beam and greater than the deviation value in the at least one beam greater than the second preset channel quality threshold value is determined as the first beam set.

It is to be noted that since the characteristic information, received by the network device, of beams in the first beam set is screened by the terminal device, the network device may also determine, according to own judgment, whether to receive a beam selected by the terminal device. Specifically, the network device may determine, according to the channel quality of the beam and/or a load condition of a current beam, whether to accept to take the beam as the target beam to perform the beam management, and if yes, the indication information returned to the terminal device carries acknowledgement information.

Optionally, as an embodiment, the method may further include: the terminal device determines at least one beam greater than a second preset channel quality threshold value in the second beam set as the first beam set; and that the terminal device manages beam connection according to the target beam may include: the terminal device establishes auxiliary connection of the target beam according to the target beam.

Specifically, an auxiliary connection beam is used when one beam or a plurality of beams are taken as main connection beams at present, the current service processing still cannot be met, or the processing effect is poor. The terminal device may establish the auxiliary connection to configure a part of bearers or data streams to the auxiliary connection beam.

The terminal device determines the at least one beam greater than the second preset channel quality threshold value in the second beam set as the first beam set, and sends the characteristic information of each beam in the first beam set to the network device; the terminal device determines the target beam in the first beam set and notifies to the terminal device via indication information; and the terminal establishes the auxiliary connection of the target beam.

In this embodiment of the disclosure, when the auxiliary connection is established, a channel quality state in which the current beam is connected may not be considered. Of course, it is better to select the auxiliary connection in a condition in which the channel quality of the current beam is greater than the first preset threshold value. In the condition in which the channel quality of the current beam is greater than the first preset threshold value, it may be appropriate to select the target beam first and then switch to the target beam. In a specific implementation manner, it is selected according to an actual requirement, which is not defined by this embodiment of the disclosure.

The terminal device may further consider to compare the channel quality of the first beam with the at least one beam greater than the second preset channel quality threshold value. Specifically, the terminal device may determine a beam higher than the channel quality of the first beam in the at least one beam greater than the second preset channel quality threshold value as the first beam set. A deviation value may further be provided, i.e., a beam higher than the channel quality of the first beam and greater than the deviation value in the at least one beam greater than the second preset channel quality threshold value is determined as the first beam set.

It should be understood that one or more target beams may be provided, which is not defined by the disclosure.

Optionally, as an embodiment, when the terminal device establishes the auxiliary connection of the target beam, the terminal device may first determine a beam greater than the second preset channel quality threshold value as a third beam set and then determines a beam with the best channel quality to form the first beam set and send the first beam set to the network device; and the indication information replied by the network device to the terminal device carries acknowledgement information. The acknowledgement information carries identification information for accepting or not accepting the target beam. If information that may not carry a beam ID is completely accepted or is not completely accepted, the terminal device may maintain the current beam connection at this moment.

The terminal device may further consider to compare the channel quality of the first beam with at least one beam greater than the second preset channel quality threshold value. Specifically, the terminal device may determine a beam higher than the channel quality of the first beam in the at least one beam greater than the second preset channel quality threshold value as the first beam set. A deviation value may further be provided, i.e., a beam higher than the channel quality of the first beam and greater than the deviation value in the at least one beam greater than the second preset channel quality threshold value is determined as the first beam set.

Optionally, as an embodiment, the method may further include: the terminal device determines at least one beam smaller than the first preset channel quality threshold value in the second beam set as the first beam set; and that the terminal device manages beam connection according to the target beam may include: the terminal device deletes the auxiliary connection of the target beam according to the target beam.

Specifically, in this embodiment of the disclosure, the second beam set includes at least one auxiliary beam that is being connected at present; the at least one beam smaller than the first preset channel quality threshold value in the second beam set is determined as the first beam set and each beam in the first beam set is sent to the network device; the network device determines the target beam and notifies the terminal device via indication information; and the terminal device deletes the auxiliary connection of the target beam.

It should be understood that one or more target beams may be provided, which is not defined by the disclosure.

Optionally, when the terminal device deletes the auxiliary connection of the target beam, the terminal device may first determine a beam greater than the second preset channel quality threshold value as a third beam set and then determines a beam with the best channel quality to form the first beam set and send the first beam set to the network device;

and the indication information replied by the network device to the terminal device carries acknowledgement information. The acknowledgement information carries identification information for accepting or not accepting the target beam. Information that may not carry a beam ID is completely accepted or is not completely accepted.

Optionally, as an embodiment, the first beam is a boundary beam of a fourth beam set; and characteristic information of each of a plurality of beams included in the fourth beam set is the same as that of the first beam.

Specifically, this embodiment of the disclosure may further be applied to a beam group and characteristic information in the beam group is the same. Therefore, when the terminal device is switched from the first beam connected at present to any beam in the beam group, the network device does not need to be notified. The terminal device may identify whether a beam is an intra-group beam according to a beam ID of each beam, or the terminal device configures a group ID to each beam in the group.

In other words, the terminal device can know characteristic information of the intra-group beam in advance. The terminal device may determine the boundary beam, or the boundary beam is designated by the network device. If the terminal device is connected to the boundary beam, the terminal device needs to measure characteristic information of surrounding beams and determines the target beam according to the characteristic information; or the target beam is determined by the network device; and then the beam management is performed.

It is to be noted that when the terminal device is moved to the boundary beam, it may be appropriate to only measure characteristic information of beams out of a current beam group and may also be appropriate to measure all beams, all of which are not defined by the disclosure.

It should be understood that one or more boundary beams may be provided, and the boundary beam may also be any one or more beams determined by the terminal device or designated by the network device in the beam group, all of which are not defined by the disclosure. The name of the "boundary beam" is not defined by the disclosure. As long as a beam connected to the group is provided, beams whose surrounding beams need to be measured to determine the target beam all are within the scope of protection of the disclosure.

It should be further understood that beam IDs in a same beam group are different but the beam IDs in different beam groups may be the same. When the terminal device sends the characteristic information of the beams to the network device, the network device may further distinguish beams having the same beam IDs according to group IDs of the beam groups, so that the target beam can be determined accurately.

Optionally, as an embodiment, the indication information carries at least one of a beam ID of the target beam, a cell ID, a group ID, a network device ID of a second network device or beam configuration information, where the second network device is a network device corresponding to the target beam.

Specifically, the target beam carries the beam ID, the beam group ID and the beam configuration information, so that the terminal device knows which beam is the selected beam and what configuration information is used by the target beam. If the target beam and the first beam do not pertain to a same network device, the indication information sent to the terminal device by the network device further carries a network device ID of the network device to which the target beam belongs, or a cell ID of a cell to which the target beam belongs, or may carry both. At this moment, the beam configuration information is configured by the network device (indicated as the second network device) to which the target beam belongs.

Therefore, with the method for managing the beams in this embodiment of the disclosure, the terminal device sends the characteristic information of each beam in the beam set to the network device, the network device determines the target beam according to the characteristic information and receives the indication information sent by the network device and used for indicating the determined target beam, and thus the beam management is performed according to the target beam. In this way, the terminal device sends the characteristic information of the beams, the network device determines an optimal target beam for the terminal device and then the beam management is performed according to the target beam. Therefore, the quality of signal transmission is improved.

Figure 3:
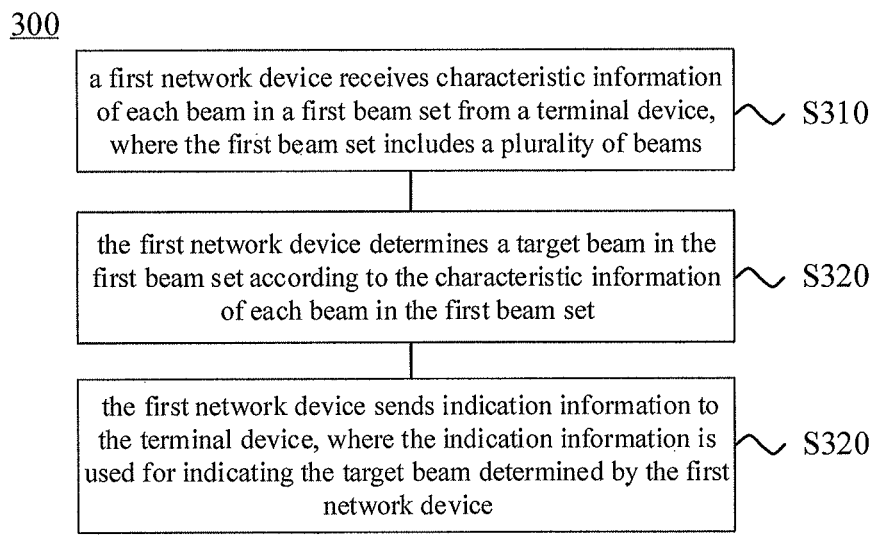
FIG. 3 illustrates a schematic diagram of a method for managing beams according to another embodiment of the disclosure.

FIG. 3 illustrates a schematic diagram of a method 300 for managing beams according to an embodiment of the disclosure. An execution main body of the method 300 may be a network device. The method 300 may include the following operations.

At S310, a first network device receives characteristic information of each beam in a first beam set from a terminal device, where the first beam set includes a plurality of beams.

At S320, the first network device determines a target beam in the first beam set according to the characteristic information of each beam in the first beam set.

At S330, the first network device sends indication information to the terminal device, where the indication information is used for indicating the target beam determined by the first network device.

Specifically, the first beam set includes at least one beam. The network device (indicated as the first network device) receives the characteristic information of each beam in the first beam set from the terminal device, and the network device determines the target beam according to the characteristic information and sends the indication information for indicating the target beam to the terminal device. In this way, the terminal device may perform the beam management according to the target beam.

It should be understood that, in this embodiment of the disclosure, the description on the interaction and relevant characteristics, functions and the like at the terminal device side corresponds to that at the network device side. For the briefness, details are not repeated.

Therefore, with the method for managing the beams in this embodiment of the disclosure, the network device receives the characteristic information, sent by the terminal device, of each beam in the beam set, determines the target beam according to the characteristic information, and sends the indication information for indicating the determined target beam to the terminal device, so that the terminal device performs the beam management according to the target beam. In this way, the terminal device sends the characteristic information of the beams, the network device determines an optimal target beam for the terminal device and then the beam management is performed according to the target beam. Therefore, the quality of signal transmission is improved.

Optionally, as an embodiment, that a first network device receives characteristic information of each beam in a first beam set from a terminal device may include: the first network device receives the characteristic information of each beam in the first beam set from the terminal device, where the characteristic information carries channel quality information used for indicating the channel quality.

Specifically, the terminal device may determine the channel quality of each beam by itself, or the channel quality is determined by the network device to send to the terminal device, and channel measurement information is carried in characteristic information of a beam received by the network device; and thus, the network device determines the target beam according to the channel measurement information.

Optionally, as an embodiment, the first beam set is determined in accordance with a relationship between a beam in a second beam set and preset channel quality; the second beam set includes one or more beams, characteristic information of which can be measured by the terminal device in a first beam used by the terminal device; and the first beam corresponds to the first network device.

Optionally, as an embodiment, the first beam is a boundary beam of a fourth beam set; and characteristic information of each of a plurality of beams included in the fourth beam set is the same as that of the first beam.

Specifically, this embodiment of the disclosure may further be applied to a beam group and characteristic information in the beam group is the same. Therefore, when the terminal device is switched from the first beam connected at present to any beam in the beam group, the network device does not need to be notified. In other words, the terminal device can know characteristic information of the intra-group beam in advance. The terminal device may determine the boundary beam, or the boundary beam is designated by the network device. If the terminal device is connected to the boundary beam, the terminal device needs to determine the target beam; or the target beam is determined by the network device; and then the beam management is performed.

It should be understood that one or more boundary beams may be provided, and the boundary beam may also be any beam determined by the terminal device or designated by the network device in the beam group, all of which are not defined by the disclosure.

Optionally, as an embodiment, the target beam corresponds to a second network device; the method may further include: the first network device sends a beam configuration request message to the second network device, where the beam configuration request message carries a beam ID of the target beam; and the first network device receives a beam configuration response message sent by the second network device, where the beam configuration response message carries beam configuration information; and that the first network device sends indication information to the terminal device may include: the first network device sends indication information carrying the beam configuration information, the beam ID of the target beam and a network device ID of the second network device to the terminal device.

Specifically, the target beam carries the beam ID and the beam configuration information, so that the terminal device knows which beam is the selected beam and what configuration information is used by the target beam. If the target beam and the first beam do not pertain to a same network device, the indication information sent to the terminal device by the network device further carries a network device ID of the network device to which the target beam belongs, or a cell ID of a cell to which the target beam belongs, or may carry both. At this moment, the beam configuration information is configured by the network device (indicated as the second network device) to which the target beam belongs.

Specifically, the first network device may send the beam configuration request message to the second network device, where the beam configuration request message carries the beam ID of the target beam; the second network device allocates the beam configuration information or resource configuration information and the like to the second network device and sends the beam configuration response message to the first network device, where the beam configuration response message carries the beam configuration information; and the first network device sends the beam configuration information allocated by the second network device to the terminal device. The beam configuration information may be carried in the indication information, and may also be sent independently.

Therefore, with the method for managing the beams in this embodiment of the disclosure, the network device receives the characteristic information, sent by the terminal device, of each beam in the beam set, determines the target beam according to the characteristic information, and sends the indication information for indicating the determined target beam to the terminal device, so that the terminal device performs the beam management according to the target beam. In this way, the terminal device sends the characteristic information of the beams, the network device determines an optimal target beam for the terminal device and then the beam management is performed according to the target beam. Therefore, the quality of signal transmission is improved.

Figure 4:
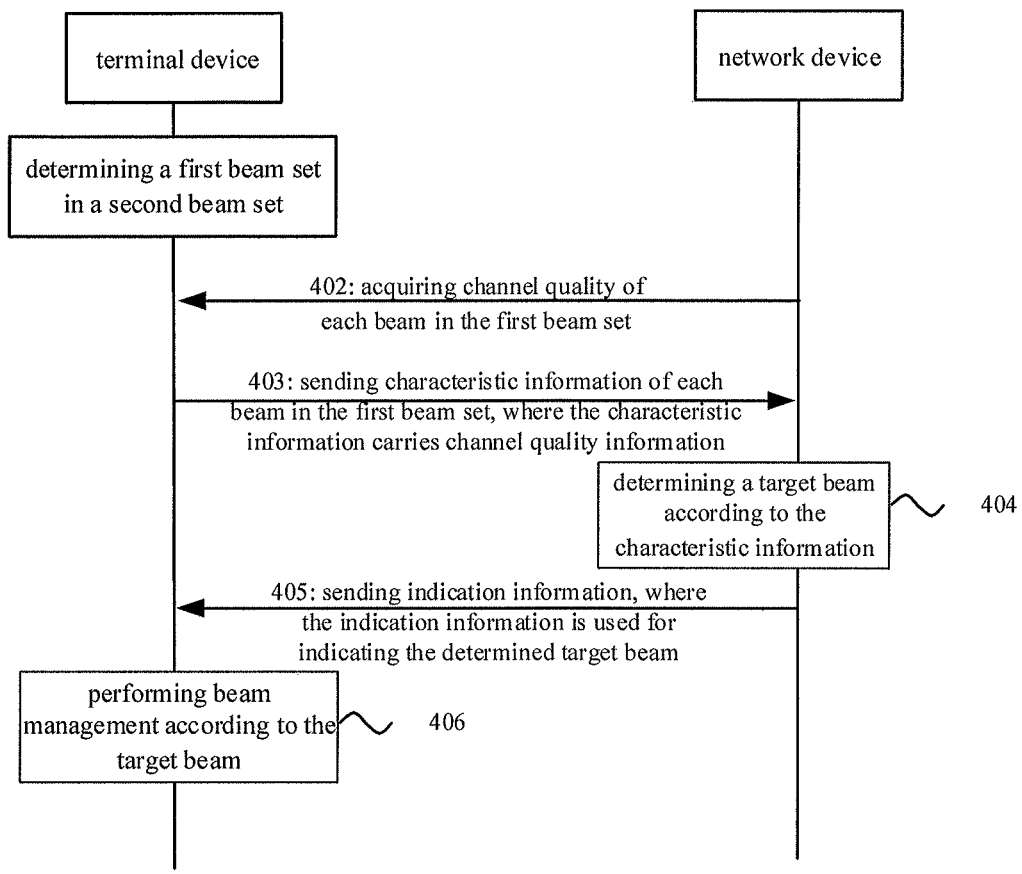
FIG. 4 illustrates a schematic flowchart of a method for managing beams according to an embodiment of the disclosure.

An embodiment of the disclosure will be described below in detail in combination with FIG. 4. It is to be noted that the following description is merely to help those skilled in the art better understand the embodiments of the present disclosure and is not intended to limit a scope of the embodiments of the disclosure.

At 401, a terminal device determines, in a second beam set, a first beam set that meets a preset condition.

At 402, the terminal device acquires channel quality of each beam in the first beam set.

At 403, the terminal device sends characteristic information of each beam in the first beam set, where the characteristic information carries channel quality information of beams.

At 404, a network device determines a target beam according to the characteristic information of each beam.

At 405, the network device sends indication information to the terminal device, where the indication information is used for indicating the determined target beam.

At 406, the network device performs beam management according to the target beam.

Therefore, with the method for managing the beams in this embodiment of the disclosure, the terminal device determines, in the second beam set through which the characteristic information can be known, the first beam set that meet the preset condition, and sends the characteristic information of each beam in the first beam set to the network device, the network device determines the target beam according to the characteristic information and receives the indication information sent by the network device and used for indicating the determined target beam, and thus the beam management is performed according to the target beam. In this way, the terminal device sends the characteristic information of the beams, the network device determines an optimal target beam for the terminal device and then the beam management is performed according to the target beam. Therefore, the quality of signal transmission is improved.

It should be understood that, in each embodiment of the disclosure, sequence numbers of the foregoing processes do not mean execution sequences in various embodiments of the disclosure. The execution sequences of the processes should be determined according to functions and internal logic of the processes, and should not be construed as any limitation on the implementation processes of the embodiments of the disclosure.

Figure 5:
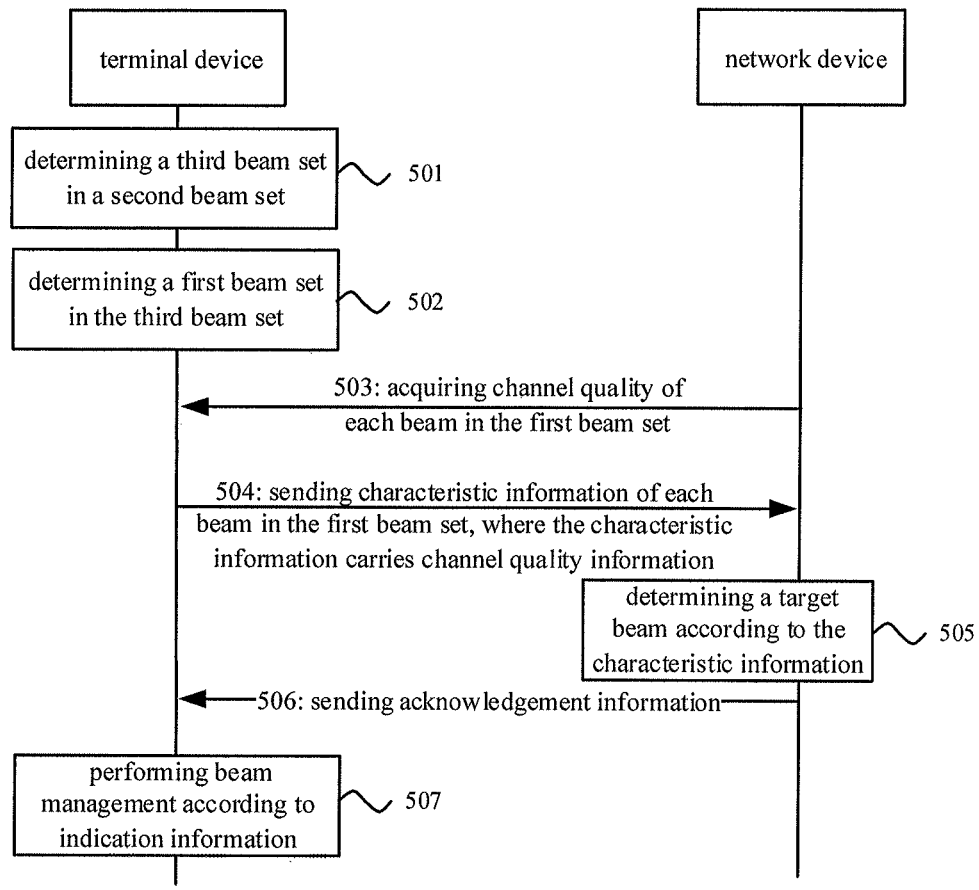
FIG. 5 illustrates a schematic flowchart of a method for managing beams according to another embodiment of the disclosure.

Another embodiment of the disclosure will be described below in detail in combination with FIG. 5. It is to be noted that the following description is merely to help those skilled in the art better understand the embodiments of the present disclosure and is not intended to limit a scope of the embodiments of the disclosure.

At 501, a terminal device determines, in a second beam set, a third beam set that meets a preset condition.

At 502, the terminal device determines a first beam set in the third beam set, where the first beam may be an optimal target beam determined by the terminal device.

At 503, the terminal device acquires channel quality of each beam in the first beam set.

At 504, the terminal device sends characteristic information of each beam in the first beam set, where the characteristic information carries channel quality information of beams.

At 505, a network device determines a target beam according to the characteristic information of each beam, and the network device determines whether to accept the target beam.

At 506, the network device sends acknowledgement information to the terminal device, where if the network device determines to receive the target beam, a beam ID of the target beam may be carried.

At 507, the network device performs beam management according to the target beam.

Therefore, with the method for managing the beams in this embodiment of the disclosure, the terminal device determines, in the second beam set through which the characteristic information can be known, the third beam set that meet the preset condition, then selects, in the third beam set, the optimal target beam determined by the terminal device to form the first beam set and sends the characteristic information of each beam in the first beam set to the network device, the network device determines the target beam according to the characteristic information and receives the indication information sent by the network device and used for indicating the determined target beam, and thus the beam management is performed according to the target beam. In this way, the terminal device sends the characteristic information of the beams, the network device determines an optimal target beam for the terminal device and then the beam management is performed according to the target beam. Therefore, the quality of signal transmission is improved.

The method for managing the beams according to the embodiments of the disclosure is described above. Hereinafter, the network device and the terminal device according to the embodiments of the disclosure will be described.

Figure 6:
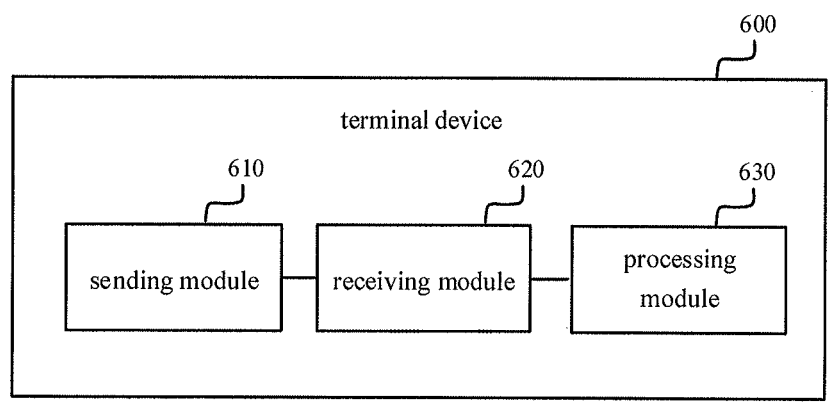
FIG. 6 illustrates a schematic block diagram of a terminal device according to an embodiment of the disclosure.

FIG. 6 illustrates a schematic block diagram of a terminal device 600 according to an embodiment of the disclosure. As shown in FIG. 6, the terminal device 600 may include: a sending module 610, a receiving module 620 and a processing module 630.

The sending module 610 is configured to send characteristic information of each beam in a first beam set to a first network device, where the first beam set includes at least one beam, and the characteristic information is used for the first network device to determine a target beam.

The receiving module 620 is configured to receive indication information sent by the first network device, where the indication information is used for indicating the target beam determined by the first network device.

The processing module 630 is configured to perform the beam management according to the target beam.

Optionally, the receiving module 620 is further configured to acquire channel quality of each beam in the first beam set; and the sending module 610 is specifically configured to: send the characteristic information of each beam in the first beam set to the first network device, where the characteristic information carries channel quality information used for indicating the channel quality.

Optionally, the first beam set is determined in accordance with a relationship between channel quality of a beam in a second beam set and preset channel quality; the second beam set includes one or more beams, characteristic information of which can be measured by the terminal device in a first beam used by the terminal device; and the first beam corresponds to the first network device.

Optionally, the processing module 630 is specifically configured to: determine the first beam set according to a relationship among the channel quality of the first beam, the channel quality of the beam in the second beam set and the preset channel quality; and perform beam switching from the first beam to the target beam according to the target beam.

Optionally, the processing module 630 is specifically configured to: determine, when the channel quality of the first beam is smaller than a first preset channel quality threshold value, at least one beam greater than a second preset channel quality threshold value in the second beam set as the first beam set.

Optionally, the processing module 630 is specifically configured to: determine, when the channel quality of the first beam is smaller than the first preset channel quality threshold value, at least one beam greater than the second preset channel quality threshold value in the second beam set as a third beam set; and determine a beam with the highest channel quality in the third beam set as the first beam set.

Optionally, the processing module 630 is specifically configured to: determine at least one beam greater than the second preset channel quality threshold value in the second beam set as the first beam set; and establish auxiliary connection of the target beam according to the target beam.

Optionally, the processing module 630 is specifically configured to: determine at least one beam greater than the second preset channel quality threshold value in the second beam set as the third beam set; determines a beam with the highest channel quality in the third beam set as the first beam set; and establish auxiliary connection of the target beam according to the target beam.

Optionally, the processing module 630 is specifically configured to: determine at least one beam smaller than the first preset channel quality threshold value in the second beam set as the first beam set; and deletes the auxiliary connection of the target beam according to the target beam.

Optionally, the processing module 630 is specifically configured to: determine at least one beam smaller than the first preset channel quality threshold value in the second beam set as the third beam set; determines a beam with the lowest channel quality in the third beam set as the first beam set; and delete the auxiliary connection of the target beam according to the target beam.

Optionally, the first beam is a boundary beam of a fourth beam set; and characteristic information of each of a plurality of beams included in the fourth beam set is the same as that of the first beam.

Optionally, the indication information carries at least one of a beam ID of the target beam, a beam group ID of the target beam, a cell ID, a network device ID of a second network device or beam configuration information, where the second network device is a network device corresponding to the target beam.

Optionally, the processing module 630 is specifically configured to: send a signal by using the target beam.

Optionally, the characteristic information of each beam in the first beam set further carries at least one of the beam ID or the beam group ID.

Therefore, with the terminal device in this embodiment of the disclosure, the terminal device sends the characteristic information of each beam in the beam set to the network device, the network device determines the target beam according to the characteristic information and receives the indication information sent by the network device and used for indicating the determined target beam, and thus the beam management is performed according to the target beam. In this way, the terminal device sends the characteristic information of the beams, the network device determines an optimal target beam for the terminal device and then the beam management is performed according to the target beam. Therefore, the quality of signal transmission is improved.

Figure 7:
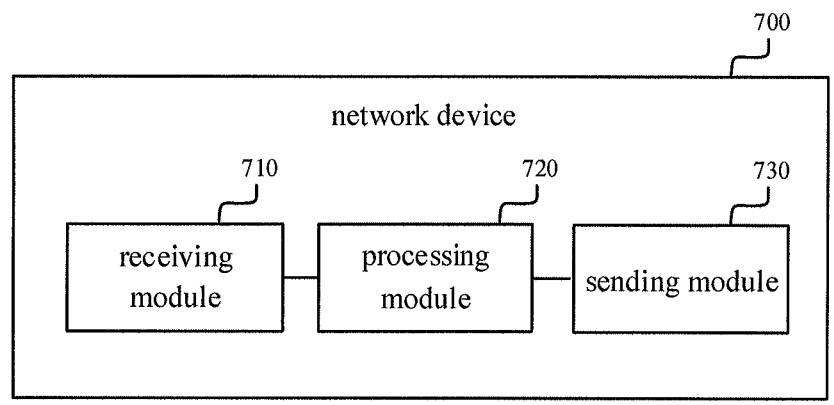
FIG. 7 illustrates a schematic block diagram of a network device according to an embodiment of the disclosure.

FIG. 7 illustrates a schematic block diagram of a network device 700 according to an embodiment of the disclosure. As shown in FIG. 7, the network device 700 may include: a receiving module 710, a processing module 720 and a sending module 730.

The receiving module 710 is configured to receive characteristic information of each beam in a first beam set from a terminal device, where the first beam set includes a plurality of beams.

The processing module 720 is configured to determine a target beam in the first beam set according to the characteristic information, received by the receiving module, of each beam in the first beam set.

The sending module 730 is configured to send indication information to the terminal device, where the indication information is used for indicating the target beam determined by the first network device.

Optionally, the receiving module 710 is specifically configured to: receive the characteristic information of each beam in the first beam set from the terminal device, where the characteristic information carries channel quality information used for indicating the channel quality.

The first beam set is determined in accordance with a relationship between a beam in a second beam set and preset channel quality; the second beam set includes one or more beams, characteristic information of which can be measured by the terminal device in a first beam used by the terminal device; and the first beam corresponds to the first network device.

Optionally, the first beam is a boundary beam of a fourth beam set; and characteristic information of each of a plurality of beams included in the fourth beam set is the same as that of the first beam.

Optionally, the target beam corresponds to a second network device; the sending module 730 is further configured to send a beam configuration request message to the second network device, where the beam configuration request message carries a beam ID of the target beam; the receiving module 710 is further configured to receive a beam configuration response message sent by the second network device, where the beam configuration response message carries beam configuration information; and the sending module 730 is specifically configured to: send indication information carrying the beam configuration information, the beam ID of the target beam and a network device ID of the second network device to the terminal device.

Optionally, the indication information carries at least one of the beam ID or the beam group ID of the target beam.

Optionally, the characteristic information of each beam in the first beam set further carries at least one of the beam ID or the beam group ID.

Therefore, with the network device in this embodiment of the disclosure, by receiving the characteristic information, sent by the terminal device, of each beam in the beam set, determining the target beam according to the characteristic information, and sending the indication information for indicating the determined target beam to the terminal device, the terminal device performs the beam management according to the target beam. In this way, the terminal device sends the characteristic information of the beams, the network device determines an optimal target beam for the terminal device and then the beam management is performed according to the target beam. Therefore, the quality of signal transmission is improved.

Figure 8:
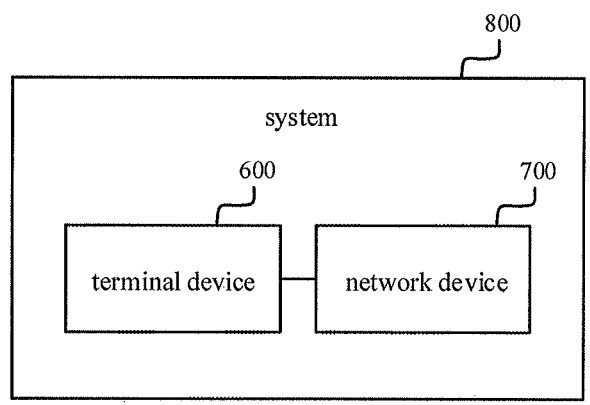
FIG. 8 illustrates a schematic block diagram of a system for managing beams according to an embodiment of the disclosure.

FIG. 8 illustrates a schematic block diagram of a system 800 for managing beams according to an embodiment of the disclosure. The system 800 may include:

the terminal device 600 in the foregoing embodiment of the disclosure and the network device 700 in the foregoing embodiment of the disclosure.

Figure 9:
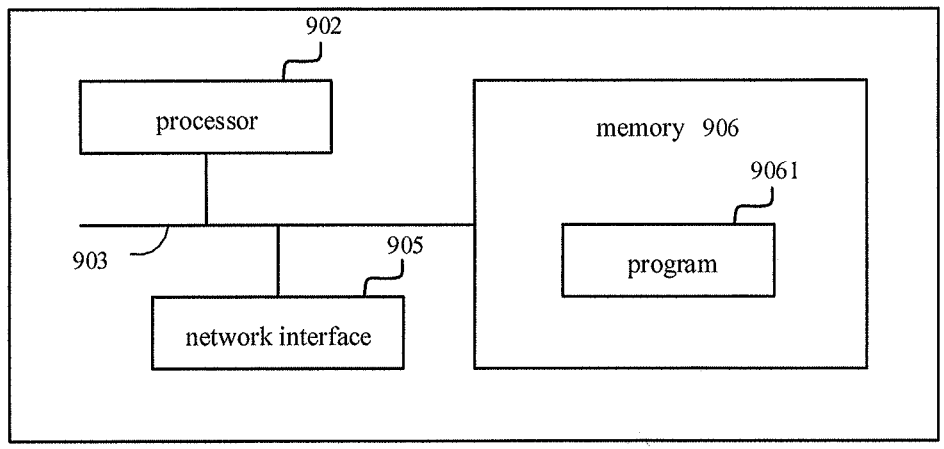
FIG. 9 illustrates a structural schematic diagram of a terminal device according to an embodiment of the disclosure.

FIG. 9 illustrates a structure of a terminal device provided by an embodiment of the disclosure, which may include at least one processor 902 (such as a universal Central Processing Unit (CPU) having computing and processing capabilities, a Digital Signal Processor (DSP), an Application Specific Integrated Circuit (ASIC) and a Field Programmable Gate Array (FPGA)). The processor is configured to manage and modulate each module and device in the terminal device. The structure may further include at least one network interface 905 or other communication interfaces, a memory 906 and at least one bus system 903. Each component of the terminal device is coupled together via the bus system 903. The bus system 903 may include a data bus, a power bus, a control bus, a state signal bus and the like. For the clarity of the description, all buses in the figures are labeled as the bus system 903.

The method disclosed by the embodiments of the disclosure may be applied to a processor 902, or may be applied to executing an executable module stored in the memory 906, such as a computer program. The memory 906 may include a Random-Access Memory (RAM) and may further include a non-volatile memory. The memory may include a Read-Only Memory (ROM) and an RAM and provides necessary signaling or data, programs and the like for the processor. A part of the memory may further include a Nonvolatile Random Access Memory (NVRAM). The communication connection with at least one other network element is implemented via at least one network interface 905 (it may be wired or wireless).

In some embodiments, the memory 906 stores a program 9061, and the processor 902 executes the program 9061 and is configured to execute the following operations:

send characteristic information of each beam in a first beam set to a first network device via the network interface 905, where the first beam set includes at least one beam, and the characteristic information is used for the first network device to determine a target beam;

receive, via the network interface 905, indication information sent by the first network device, where the indication information is used for indicating the target beam determined by the first network device; and perform the beam management according to the target beam.

It is to be noted that, the access network device may be the terminal device in the above embodiment specifically, and may be configured to execute each step and/or process corresponding to the terminal device in the above method embodiment.

Therefore, with the above technical solutions provided by this embodiment of the disclosure, the terminal device sends the characteristic information of each beam in the beam set to the network device, the network device determines the target beam according to the characteristic information and receives the indication information sent by the network device and used for indicating the determined target beam, and thus the beam management is performed according to the target beam. In this way, the terminal device sends the characteristic information of the beams, the network device determines an optimal target beam for the terminal device and then the beam management is performed according to the target beam. Therefore, the quality of signal transmission is improved.

Figure 10:
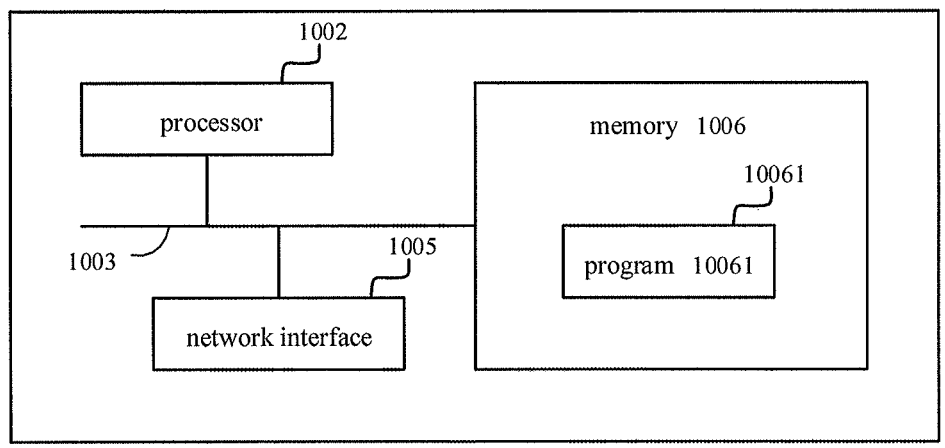
FIG. 10 illustrates a structural schematic diagram of a network device according to an embodiment of the disclosure.

FIG. 10 illustrates a structure of a network device provided by an embodiment of the disclosure, which may include at least one processor 1002 (such as a universal Central Processing Unit (CPU) having computing and processing capabilities, a Digital Signal Processor (DSP), an Application Specific Integrated Circuit (ASIC) and a Field Programmable Gate Array (FPGA)). The processor is configured to manage and modulate each module and device in the terminal device. The structure may further include at least one network interface 1005 or other communication interfaces, a memory 1006 and at least one bus system 1003. Each component of the terminal device is coupled together via the bus system 1003. The bus system 1003 may include a data bus, a power bus, a control bus, a state signal bus and the like. For the clarity of the description, all buses in the figures are labeled as the bus system 1003.

The method disclosed by the embodiments of the disclosure may be applied to a processor 1002, or may be applied to executing an executable module stored in the memory 1006, such as a computer program. The memory 1006 may include a Random-Access Memory (RAM) and may further include a non-volatile memory. The memory may include a Read-Only Memory (ROM) and an RAM and provides necessary signaling or data, programs and the like for the processor. A part of the memory may further include a Nonvolatile Random Access Memory (NVRAM). The communication connection with at least one other network element is implemented via at least one network interface 1005 (it may be wired or wireless).

In some embodiments, the memory 1006 stores a program 10061, and the processor 1002 executes the program 10061 and is configured to execute the following operations:

receive characteristic information of each beam in a first beam set from a terminal device via the network interface 1005, where the first beam set includes a plurality of beams;

determine a target beam in the first beam set according to the characteristic information of each beam in the first beam set; and send, via the network interface 1005, indication information to the terminal device, where the indication information is used for indicating the target beam determined by the first network device.

It is to be noted that, the access network device may be the network device in the above embodiment specifically, and may be configured to execute each step and/or process corresponding to the network device in the above method embodiment.

Therefore, with the above technical solutions provided by this embodiment of the disclosure, by receiving the characteristic information, sent by the terminal device, of each beam in the beam set, determining the target beam according to the characteristic information, and sending the indication information for indicating the determined target beam to the terminal device, the terminal device performs the beam management according to the target beam. In this way, the terminal device sends the characteristic information of the beams, the network device determines an optimal target beam for the terminal device and then the beam management is performed according to the target beam. Therefore, the quality of signal transmission is improved.

An embodiment of the disclosure further provides a computer storage medium; and the computer storage medium may store a program instruction for indicating any of the above methods.

Optionally, the storage medium specifically may be the memory 906 or 1006.

It should be understood that, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that, in each embodiment of the disclosure, sequence numbers of the foregoing processes do not mean execution sequences in various embodiments of the disclosure. The execution sequences of the processes should be determined according to functions and internal logic of the processes, and should not be construed as any limitation on the implementation processes of the embodiments of the disclosure.

A person of ordinary skill in the art may be aware that, in combination with the examples described in the embodiments disclosed in this specification, units and algorithm steps may be implemented by electronic hardware, computer software or a combination of computer software and electronic hardware. In order to describe the interchangeability between hardware and software, the constitutions and steps of each example are described generally according to functions in the above description. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the disclosure essentially, or the part contributing to the prior art, or some of the technical solutions may be implemented in a form of a software product. The software product is stored in a storage medium and includes several instructions for instructing a computer device (which may be a personal computer, a server, or a network device) to perform all or some of the steps of the methods described in the embodiments of the disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementation manners of the disclosure but are not intended to limit the protection scope of the disclosure. Any variation or replacement readily figured out by a person skilled in the art within the technical scope disclosed in the disclosure shall fall within the protection scope of the disclosure. Therefore, the protection scope of the disclosure shall be subject to the protection scope of the claims.

The invention claimed is:

1. A method for managing beams, comprising:
sending, by a terminal device, characteristic information of each beam in a first beam set to a first network device, wherein the first beam set is determined in accordance with a relationship between channel quality of a beam in a second beam set and preset channel quality, the terminal device takes a beam with the best channel quality as the beam to form the first beam set, the first beam set comprises at least one beam, and the characteristic information is used for the first network device to determine a target beam, and the terminal device sends a signal to the first network device by employing a plurality of beams in a beamforming manner;
receiving, by the terminal device, indication information sent by the first network device, wherein the indication information carries a beam Identity, ID, of the target beam, a network device ID of a second network device and beam configuration information of the target beam, and the second network device is a network device corresponding to the target beam, wherein the beam configuration information of the target beam is configured by the second network device and is sent to the terminal device by the first network device; and
performing, by the terminal device, the beam management according to the indication information;
wherein the method further comprises:
acquiring, by the terminal device, channel quality of each beam in the first beam set,
wherein sending, by a terminal device, characteristic information of each beam in a first beam set to a first network device comprises:
sending, by the terminal device, the characteristic information of each beam in the first beam set to the first network device; and the characteristic information carries channel quality information used for indicating channel quality,
wherein the second beam set comprises one or more beams, characteristic information of which can be measured by the terminal device in a first beam used by the terminal device; and the first beam corresponds to the first network device, and
wherein the first beam is a beam used by the terminal device at present and is within a range covered by the first network device, the second beam set comprises adjacent beams of the first beam, which are within the range covered by the first network device or a range covered by other network devices, wherein the adjacent beams are composed of all or part of beams through which the terminal device can acquire characteristic information of surrounding beams.

2. The method of claim 1, further comprising:
determining, by the terminal device, the first beam set according to a relationship among the channel quality of the first beam, the channel quality of the beam in the second beam set and the preset channel quality,
wherein managing, by the terminal device, beam connection according to the indication information comprises:
performing, by the terminal device, beam switching from the first beam to the target beam according to the indication information.

3. The method of claim 2, wherein determining, by the terminal device, the first beam set according to the channel quality of the first beam comprises:
responsive to that the channel quality of the first beam is smaller than a first preset channel quality threshold value, determining, by the terminal device, at least one beam greater than a second preset channel quality threshold value in the second beam set as the first beam set.

4. The method of claim 2, wherein determining, by the terminal device, the first beam set according to the channel quality of the first beam comprises:
responsive to that the channel quality of the first beam is smaller than the first preset channel quality threshold value, determining, by the terminal device, at least one beam greater than the second preset channel quality threshold value in the second beam set as a third beam set; and
determining, by the terminal device, a beam with the highest channel quality in the third beam set as the first beam set.

5. The method of claim 1, further comprising:
determining, by the terminal device, at least one beam greater than a second preset channel quality threshold value in the second beam set as the first beam set,
wherein managing, by the terminal device, beam connection according to the target beam comprises:
establishing, by the terminal device, auxiliary connection of the target beam according to the target beam.

6. The method of claim 1, further comprising:
determining, by the terminal device, at least one beam greater than a second preset channel quality threshold value in the second beam set as the third beam set; and
determining, by the terminal device, a beam with the highest channel quality in the third beam set as the first beam set,
wherein managing, by the terminal device, beam connection according to the indication information comprises:
establishing, by the terminal device, the auxiliary connection of the target beam according to the indication information.

7. The method of claim 1, further comprising:
determining, by the terminal device, at least one beam smaller than a first preset channel quality threshold value in the second beam set as the first beam set,
wherein managing, by the terminal device, beam connection according to the indication information comprises:
deleting, by the terminal device, the auxiliary connection of the target beam according to the indication information.

8. The method of claim 1, further comprising:
determining, by the terminal device, at least one beam smaller than a first preset channel quality threshold value in the second beam set as the third beam set; and
determining, by the terminal device, a beam with the lowest channel quality in the third beam set as the first beam set,
wherein managing, by the terminal device, beam connection according to the indication information comprises:
deleting, by the terminal device, the auxiliary connection of the target beam according to the indication information.

9. The method of claim 1, wherein the first beam is a boundary beam of a fourth beam set; and characteristic information of each of a plurality of beams comprised in the fourth beam set is the same as that of the first beam.

10. The method of claim 1, wherein managing, by the terminal device, beam connection according to the indication information comprises:
sending, by the terminal device, a signal by using the target beam.

11. The method of claim 1, wherein the characteristic information of each beam in the first beam set further carries at least one of the beam ID or the beam group ID.

12. A method for managing beams, comprising:
receiving, by a first network device, characteristic information of each beam in a first beam set from a terminal device, wherein the first beam set is determined in accordance with a relationship between channel quality of a beam in a second beam set and preset channel quality, the terminal device takes a beam with the best channel quality as the beam to form the first beam set, the first beam set comprises a plurality of beams, and the terminal device sends a signal to the first network device by employing a plurality of beams in a beamforming manner;
determining, by the first network device, a target beam in the first beam set according to the characteristic information of each beam in the first beam set; and
sending, by the first network device, indication information to the terminal device, wherein the indication information carries a beam Identity, ID, of the target beam, a network device ID of a second network device and beam configuration information of the target beam, and the second network device is a network device corresponding to the target beam, wherein the beam configuration information of the target beam is configured by the second network device and is sent to the terminal device by the first network device,
wherein receiving, by a first network device, characteristic information of each beam in a first beam set from a terminal device comprises:
receiving, by the first network device, the characteristic information of each beam in the first beam set from the terminal device; and the characteristic information carries channel quality information used for indicating the channel quality,
wherein the second beam set comprises one or more beams, characteristic information of which can be measured by the terminal device in a first beam used by the terminal device; and the first beam corresponds to the first network device, and
wherein the first beam is a beam used by the terminal device at present and is within a range covered by the first network device, the second beam set comprises adjacent beams of the first beam, which are within the range covered by the first network device or a range covered by other network devices, wherein the adjacent beams are composed of all or part of beams through which the terminal device can acquire characteristic information of surrounding beams.

13. The method of claim 12, wherein the target beam corresponds to a second network device; and
the method further comprises:
sending, by the first network device, a beam configuration request message to a second network device, wherein the beam configuration request message carries a beam Identity (ID) of the target beam; and
receiving, by the first network device, a beam configuration response message sent by the second network device, wherein the beam configuration response message carries beam configuration information.

14. A terminal device for managing beams, comprising:
a processor; and
a memory for storing instructions executable by the processor;
wherein when the instructions are executed by the processor, the processor is configured to:
send, via a network interface, characteristic information of each beam in a first beam set to a first network device, wherein the first beam set is determined in accordance with a relationship between channel quality of a beam in a second beam set and preset channel quality, the terminal device takes a beam with the best channel quality as the beam to form the first beam set, the first beam set comprises at least one beam, and the characteristic information is used for the first network device to determine a target beam, and the terminal device sends a signal to the first network device by employing a plurality of beams in a beamforming manner;
receive, via the network interface, indication information sent by the first network device, wherein the indication information carries a beam Identity, ID, of the target beam, a network device ID of a second network device and beam configuration information of the target beam, and the second network device is a network device corresponding to the target beam, wherein the beam configuration information of the target beam is configured by the second network device and is sent to the terminal device by the first network device; and
perform the beam management according to the indication information;

wherein the processor is further configured to:
acquire, via the network interface, channel quality of each beam in the first beam set;
wherein the processor is specifically configured to:
send, via the network interface, the characteristic information of each beam in the first beam set to the first network device; and the characteristic information carries channel quality information used for indicating channel quality,
wherein the first beam set is determined in accordance with a relationship between channel quality of a beam in a second beam set and preset channel quality; the second beam set comprises one or more beams, characteristic information of which can be measured by the terminal device in a first beam used by the terminal device; and the first beam corresponds to the first network device, and
wherein the first beam is a beam used by the terminal device at present and is within a range covered by the first network device, the second beam set comprises adjacent beams of the first beam, which are within the range covered by the first network device or a range covered by other network devices, wherein the adjacent beams are composed of all or part of beams through which the terminal device can acquire characteristic information of surrounding beams.

15. The terminal device of claim 14, wherein the processor is specifically configured to:
determine the first beam set according to channel quality of the first beam; and
perform beam switching from the first beam to the target beam according to the indication information.

16. The terminal device of claim 15, wherein the processor is specifically configured to:
responsive to that the channel quality of the first beam is smaller than a first preset channel quality threshold value, determine at least one beam greater than a second preset channel quality threshold value in the second beam set as the first beam set.

17. A first network device, comprising:
a processor; and
a memory for storing instructions executable by the processor;
wherein when the instructions are executed by the processor, the processor is configured to:
receive via a network interface, characteristic information of each beam in a first beam set from a terminal device, wherein the first beam set is determined in accordance with a relationship between channel quality of a beam in a second beam set and preset channel quality, the terminal device takes a beam with the best channel quality as the beam to form the first beam set, the first beam set includes a plurality of beams, and the terminal device sends a signal to the first network device by employing a plurality of beams in a beamforming manner;
determine a target beam in the first beam set according to the characteristic information of each beam in the first beam set; and
send, via the network interface, indication information to the terminal device, wherein the indication information carries a beam Identity, ID, of the target beam, a network device ID of a second network device and beam configuration information of the target beam, and the second network device is a network device corresponding to the target beam, wherein the beam configuration information of the target beam is configured by the second network device and is sent to the terminal device by the first network device,
wherein the processor is specifically configured to:
receive, via the network device, the characteristic information of each beam in the first beam set from the terminal device, wherein the characteristic information carries channel quality information used for indicating the channel quality,
wherein the second beam set comprises one or more beams, characteristic information of which can be measured by the terminal device in a first beam used by the terminal device; and the first beam corresponds to the first network device, and
wherein the first beam is a beam used by the terminal device at present and is within a range covered by the first network device, the second beam set comprises adjacent beams of the first beam, which are within the range covered by the first network device or a range covered by other network devices, wherein the adjacent beams are composed of all or part of beams through which the terminal device can acquire characteristic information of surrounding beams.

18. The first network device of claim 17, wherein the target beam corresponds to a second network device;
the processor is further configured to send, via the network interface, a beam configuration request message to a second network device, wherein the beam configuration request message carries a beam Identity (ID) of the target beam; and
the processor is further configured to receive, via the network interface, a beam configuration response message sent by the second network device, wherein the beam configuration response message carries beam configuration information.

* * * * *